United States Patent
Iida

(10) Patent No.: US 10,794,931 B2
(45) Date of Patent: Oct. 6, 2020

(54) SCANNING PROBE MICROSCOPE AND CANTILEVER MOVING METHOD

(71) Applicant: Shimadzu Corporation, Kyoto (JP)

(72) Inventor: Eiji Iida, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 16/284,743

(22) Filed: Feb. 25, 2019

(65) Prior Publication Data
US 2019/0317124 A1 Oct. 17, 2019

(30) Foreign Application Priority Data
Apr. 16, 2018 (JP) ................ 2018-078424

(51) Int. Cl.
G01Q 20/02 (2010.01)
G01Q 30/14 (2010.01)
G01Q 10/04 (2010.01)
G01Q 20/04 (2010.01)

(52) U.S. Cl.
CPC ........... *G01Q 20/02* (2013.01); *G01Q 10/045* (2013.01); *G01Q 20/04* (2013.01); *G01Q 30/14* (2013.01)

(58) Field of Classification Search
USPC ............................................. 850/6
See application file for complete search history.

(56) References Cited

U.S. PATENT DOCUMENTS

| 4,935,634 | A | * | 6/1990 | Hansma | B82Y 35/00 |
|||||| 250/559.06 |
| 5,750,989 | A | * | 5/1998 | Lindsay | B82Y 35/00 |
|||||| 250/442.11 |
| 5,821,409 | A | * | 10/1998 | Honma | B82Y 20/00 |
|||||| 73/105 |
| 8,037,739 | B2 | * | 10/2011 | Ota | G01N 1/36 |
|||||| 73/53.01 |

FOREIGN PATENT DOCUMENTS

JP 2008-209127 A 9/2008
JP 2014-211372 A 11/2014

* cited by examiner

*Primary Examiner* — Phillip A Johnston
(74) *Attorney, Agent, or Firm* — Muir Patent Law, PLLC

(57) ABSTRACT

When a liquid surface is detected based on a detection signal from a photodetector during the approaching operation, a photodetector movement processor moves the photodetector to a position where reflected light from a cantilever is incident with the cantilever being in liquid. When the reflected light from the cantilever is incident on the photodetector during the approaching operation continued after the movement of the photodetector by the photodetector movement processor, an optical axis adjustment processor adjusts an optical axis of the reflected light incident on the photodetector. When a surface of a solid sample is detected based on a detection signal from the photodetector during the approaching operation continued after the adjustment of the optical axis by the optical axis adjustment processor, an approaching processor stops the approaching operation.

6 Claims, 7 Drawing Sheets

SCANNING PROBE MICROSCOPE AND CANTILEVER MOVING METHOD

CROSS REFERENCE TO RELATED APPLICATION

This application claims priority to Japanese Patent Application No. 2018-078424 filed on Apr. 16, 2018, the entire disclosure of which is incorporated by reference herein.

BACKGROUND OF THE INVENTION

Field of the Invention

The present invention relates to a scanning probe microscope having a cantilever which moves along a surface of a solid sample.

Description of the Related Art

For example, in an optical lever type scanning probe microscope, an uneven surface image of a sample can be obtained by moving a probe of a cantilever along the surface of the sample and detecting deflection of the cantilever (see, for example, JP-A-2014-211372). This type of scanning probe microscope is provided with a light irradiator for irradiating the cantilever with light and a photodetector for receiving reflected light from the cantilever.

When a sample surface is observed, first, an operation of approaching the cantilever to the sample (approaching operation) is performed. Specifically, the cantilever is moved vertically downward, so that the probe is caused to gradually approach the sample surface. Then, when a detection signal from the photodetector is changed to a preset target value, the probe is determined to have come into contact with the sample surface, and the movement of the cantilever is stopped. In this manner, the approaching operation is finished, and then the cantilever is caused to scan in a horizontal direction, so that the sample surface is observed.

In-liquid observation may be performed as one method of observing a sample surface. In the in-liquid observation, with a sample submerged in the liquid, the cantilever is lowered into the liquid, and a probe is brought into contact with the sample surface. Then, by scanning the cantilever in a horizontal direction in the liquid, the sample surface can be observed in the liquid.

In the case of performing an approaching operation during the in-liquid observation, the probe comes into contact with a liquid surface while the cantilever is caused to gradually approach the sample surface. At this time, the cantilever is deflected by resistance received from the liquid surface, and a detection signal from the photodetector reaches a preset target value. This causes the approaching operation to be stopped at the liquid surface. In this case, a worker has to manually adjust the target value and continue the approaching operation. Accordingly, there has been a problem that it takes time and labor.

SUMMARY OF THE INVENTION

The present invention has been made in view of the above circumstances, and it is an object of the present invention to provide a scanning probe microscope and a cantilever moving method capable of reducing the labor required at the time of approaching operation when in-liquid observation is performed.

(1) A scanning probe microscope according to the present invention includes a cantilever, a light irradiator, a photodetector, an approaching processor, a photodetector movement processor, and an optical axis adjustment processor. The cantilever moves along a surface of a solid sample. The light irradiator irradiates the cantilever with light. The photodetector is movably provided and receives reflected light from the cantilever. The approaching processor performs approaching operation by bringing the cantilever close to the solid sample placed in the liquid. When a liquid surface is detected based on a detection signal from the photodetector during the approaching operation, the photodetector movement processor moves the photodetector to a position where reflected light from the cantilever is incident with the cantilever being in liquid. When the reflected light from the cantilever is incident on the photodetector during the approaching operation continued after the movement of the photodetector by the photodetector movement processor, the optical axis adjustment processor adjusts an optical axis of the reflected light incident on the photodetector. When a surface of a solid sample is detected based on a detection signal from the photodetector during the approaching operation continued after the adjustment of the optical axis by the optical axis adjustment processor, the approaching processor stops the approaching operation.

According to such a configuration, in a case where in-liquid observation is performed, when a liquid surface is detected during the approaching operation, the approaching operation is continued after the photodetector is moved. The photodetector is moved to a position where reflected light from the cantilever is incident in a state where the cantilever is in the liquid. Accordingly, when the photodetector detects light during the continued approaching operation, the cantilever can be confirmed to be in the liquid. At this time, by continuing the approaching operation after adjusting an optical axis of the reflected light incident on the photodetector, a surface of a solid sample can be detected based on a detection signal from the photodetector during the approaching operation, and the approaching operation can be stopped.

Therefore, when a liquid surface is detected during the approaching operation, it is unnecessary for an operator to manually adjust a target value of a detection signal of the photodetector, and the approaching operation can be continued after the photodetector is moved. Therefore, it is possible to reduce the labor required at the time of the approaching operation in the case of performing the in-liquid observation. Then, when light is detected by the photodetector during the continued approaching operation, the approaching operation is continued after the optical axis of the reflected light incident on the photodetector is adjusted. Accordingly, after the above, when the detection signal from the photodetector reaches the target value, a surface of a solid sample can be reliably detected.

(2) The approaching processor preferably stops the movement of the cantilever during the adjustment of the optical axis by the optical axis adjustment processor.

According to the above configuration, the optical axis of the reflected light incident on the photodetector can be adjusted accurately in a state in which the movement of the cantilever is stopped after the cantilever is moved into the liquid. Therefore, the surface of the solid sample can be accurately detected based on the detection signal from the photodetector during the approaching operation that is continued after the above.

(3) The scanning probe microscope may further include a position calculation processor that calculates the position of the photodetector on which the reflected light from the cantilever is incident with the cantilever being in the liquid. In this case, the photodetector movement processor may move the photodetector to the position calculated by the position calculation processor.

According to such a configuration, an appropriate position can be calculated by the position calculation processor as the position to which the photodetector is moved when the liquid surface is detected, and the photodetector can be moved to that position. Therefore, it is possible to reliably confirm that the cantilever is in the liquid based on the detection signal from the photodetector during the approaching operation that is continued after the above.

(4) The cantilever moving method according to the present invention uses a scanning probe microscope including a cantilever that is moved along a surface of a solid sample, a light irradiator that irradiates the cantilever with light, and a photodetector that receives reflected light from the cantilever. The cantilever moving method includes an approaching step, a photodetector moving step, and a light axis adjusting step. The approaching processing performs approaching operation by bringing the cantilever close to the solid sample placed in the liquid. When a liquid surface is detected based on a detection signal from the photodetector during the approaching operation, the photodetector moving step moves the photodetector to a position where reflected light from the cantilever is incident with the cantilever being in liquid. When the reflected light from the cantilever is incident on the photodetector during the approaching operation continued after the movement of the photodetector by the photodetector moving step, the optical axis adjusting step adjusts an optical axis of the reflected light incident on the photodetector. When a surface of a solid sample is detected based on a detection signal from the photodetector during the approaching operation continued after the adjustment of the optical axis by the optical axis adjusting step, the approaching step stops the approaching operation.

(5) The approaching step preferably stops the movement of the cantilever during the adjustment of the optical axis by the optical axis adjusting step.

(6) The cantilever moving method may further include a position calculating step that calculates the position of the photodetector on which the reflected light from the cantilever is incident with the cantilever being in the liquid. In this case, the photodetector moving step may move the photodetector to the position calculated by the position calculating step.

According to the present invention, when a liquid surface is detected during the approaching operation, it is unnecessary for an operator to manually adjust a target value of a detection signal of the photodetector, and the approaching operation can be continued after the photodetector is moved. Accordingly, the labor generated during the approaching operation can be reduced when the in-liquid observation is performed.

DETAILED DESCRIPTION OF THE PREFERRED EMBODIMENTS

1. Configuration of Scanning Probe Microscope

Figure 1:
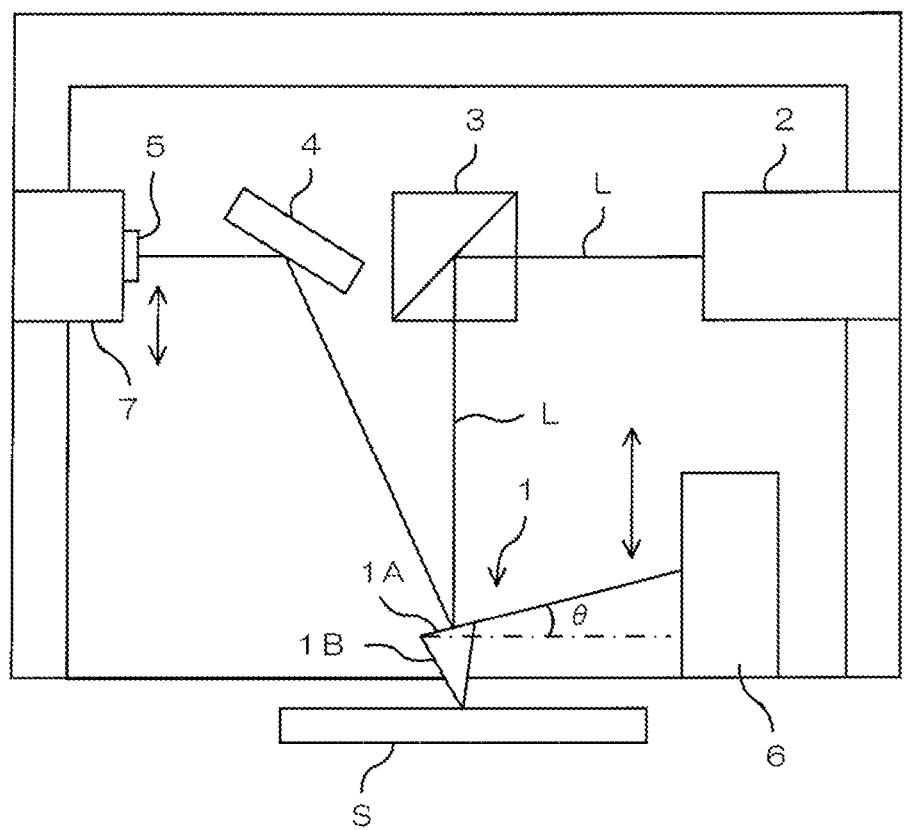
FIG. 1 is a schematic diagram showing a configuration example of a scanning probe microscope according to an embodiment of the present invention.

FIG. 1 is a schematic diagram showing a configuration example of a scanning probe microscope according to an embodiment of the present invention. The scanning probe microscope (SPM) includes a cantilever 1, a light irradiator 2, a beam splitter 3, a mirror 4, a photodetector 5, and the like, and obtains an image of an uneven surface of a sample S by moving the cantilever 1 along the surface of the sample S.

The light irradiator 2 includes a laser light source, such as, for example, a semiconductor laser, and irradiates the cantilever 1 with light. The light emitted from the light irradiator 2 is incident on the cantilever 1 via the beam splitter 3. The cantilever 1 is provided with a reflective surface 1A, and reflected light on the reflective surface 1A is reflected by the mirror 4 and received by the photodetector 5. As the photodetector 5, it is possible to employ a configuration including a photodiode, such as a quadrant photodiode, or the like.

Other optical members, such as a collimator lens and a focus lens (neither is shown), may be provided in an optical path from the light irradiator 2 to the cantilever 1. In this case, after converting the irradiation light from the light irradiator 2 into parallel light by the collimator lens, the parallel light can be condensed by the focus lens and guided to the cantilever 1 side.

In addition to the beam splitter 3, the collimator lens, the focus lens, and the like constitute an optical system for guiding the irradiation light from the light irradiator 2 to the cantilever 1. However, the configuration of the optical system is not limited to this, and it may be configured such that at least one of the optical members as described above is not provided.

The cantilever 1 is, for example, a very small member having a length of about 150 μm and a width of about 30 to 40 μm, and a probe 1B is provided on a surface opposite to the reflective surface 1A. By moving the probe 1B along the surface of the sample S, it is possible to obtain an image of an uneven surface of the sample S.

Here, the reflective surface 1A of the cantilever 1 is inclined at a predetermined inclination angle μ with respect to a direction orthogonal to an optical axis L of the irradiation light from the light irradiator 2. Therefore, when the probe 1B of the cantilever 1 is moved along the unevenness of the surface of the sample S, the cantilever 1 is deflected and the inclination angle θ of the reflective surface 1A changes. At this time, since a detection signal from the photodetector 5 is changed as a position where the photodetector 5 receives the reflected light from the reflective surface 1A is changed, an image of the uneven surface of the sample S can be obtained based on the detection signal from the photodetector 5.

In the present embodiment, the cantilever 1 and the photodetector 5 are configured to be movable. Specifically, a cantilever moving mechanism 6 for movably holding the cantilever 1 and a photodetector moving mechanism 7 for movably holding the photodetector 5 are provided.

The cantilever moving mechanism 6 can move the cantilever 1 along the optical axis L of the light incident on the cantilever 1. In this example, the cantilever moving mechanism 6 is configured to move the cantilever 1 along the vertical direction. However, the configuration is not limited to this configuration, and may be such that the cantilever 1 is moved in a direction crossing the vertical direction.

The photodetector moving mechanism 7 can move the photodetector 5 along a direction orthogonal to the optical axis L of light incident on the photodetector 5. In this example, the photodetector moving mechanism 7 is configured to move the photodetector 5 along the vertical direction. However, the configuration is not limited to the above configuration, and may be such that the photodetector moving mechanism 7 moves the photodetector 5 in the direction crossing the vertical direction.

2. Specific Method of in-Liquid Observation

FIGS. 2A to 2D are schematic diagrams for explaining a specific method for performing in-liquid observation. For example, by causing a container 9, such as a petri dish, to contain liquid, and causing the cantilever 1 to scan along the surface of the sample S with the sample (solid sample) S submerged in the liquid, observation of the surface of the sample S in the liquid (in-liquid observation) can be performed.

Although not shown in FIG. 1, as shown in FIGS. 2A to 2D, light traveling from the light irradiator 2 to the cantilever 1 passes through a transparent plate 8 and is incident on the reflective surface 1A of the cantilever 1. Therefore, the light from the light irradiator 2 incident in a direction orthogonal to the transparent plate 8 reaches the reflective surface 1A without being refracted. However, the reflected light from the reflective surface 1A is incident on the transparent plate 8 at an inclined angle, is refracted in a process of passing through the transparent plate 8, and then is reflected by the mirror 4 to be guided to the photodetector 5. The transparent plate 8 is made of, for example, glass, and functions as a holding unit for holding the cantilever 1.

Figure 2A:
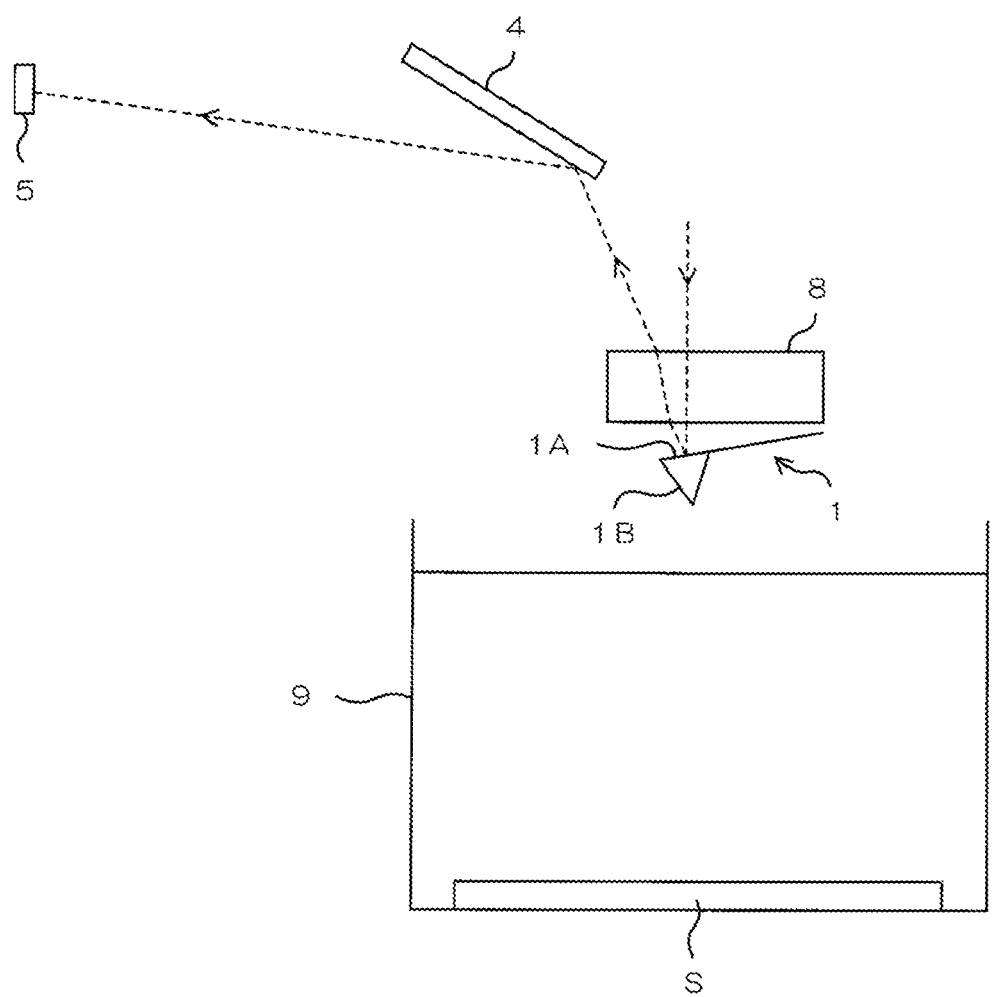
FIG. 2A is a schematic diagram for explaining a specific method for performing in-liquid observation, showing a state where a cantilever is in the atmosphere.

When in-liquid observation is performed, initially the cantilever 1 is spaced upward from a liquid surface as shown in FIG. 2A. In this state, the reflected light from the reflective surface 1A of the cantilever 1 is incident on the photodetector 5. Approaching operation is performed by bringing the cantilever 1 closer to the sample S placed in the liquid from the above state.

Figure 2B:
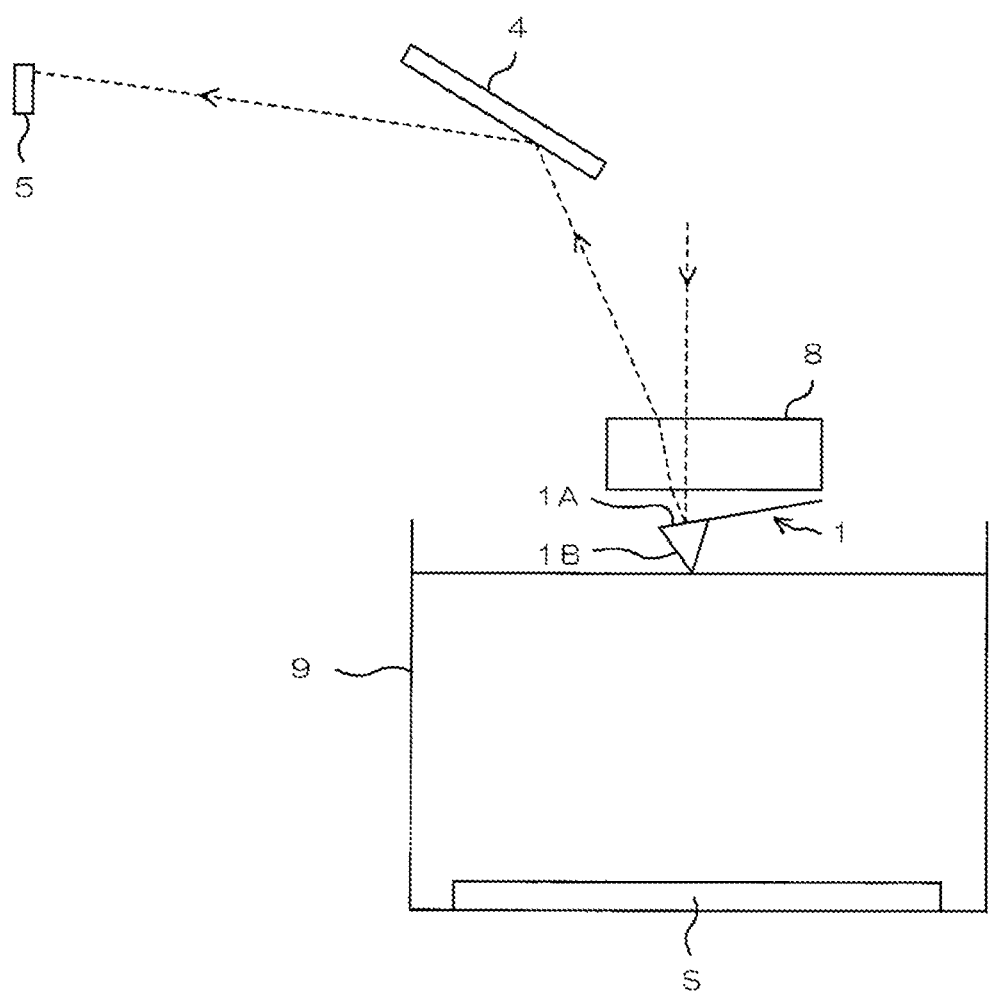
FIG. 2B is a schematic diagram for explaining a specific method for performing in-liquid observation, showing a state where the cantilever is in contact with a liquid surface.

When the approaching operation is started, the probe 1B of the cantilever 1 first comes into contact with the liquid surface as shown in FIG. 2B. At this time, as the cantilever 1 is deflected, an optical path of the reflected light from the reflective surface 1A changes, and a light receiving position for the reflected light in the photodetector 5 changes. Along with the above, the detection signal from the photodetector 5 changes. Accordingly, it is possible to detect that the probe 1B of the cantilever 1 has come into contact with the liquid surface (liquid surface detection) based on the change in the detection signal.

Figure 2C:
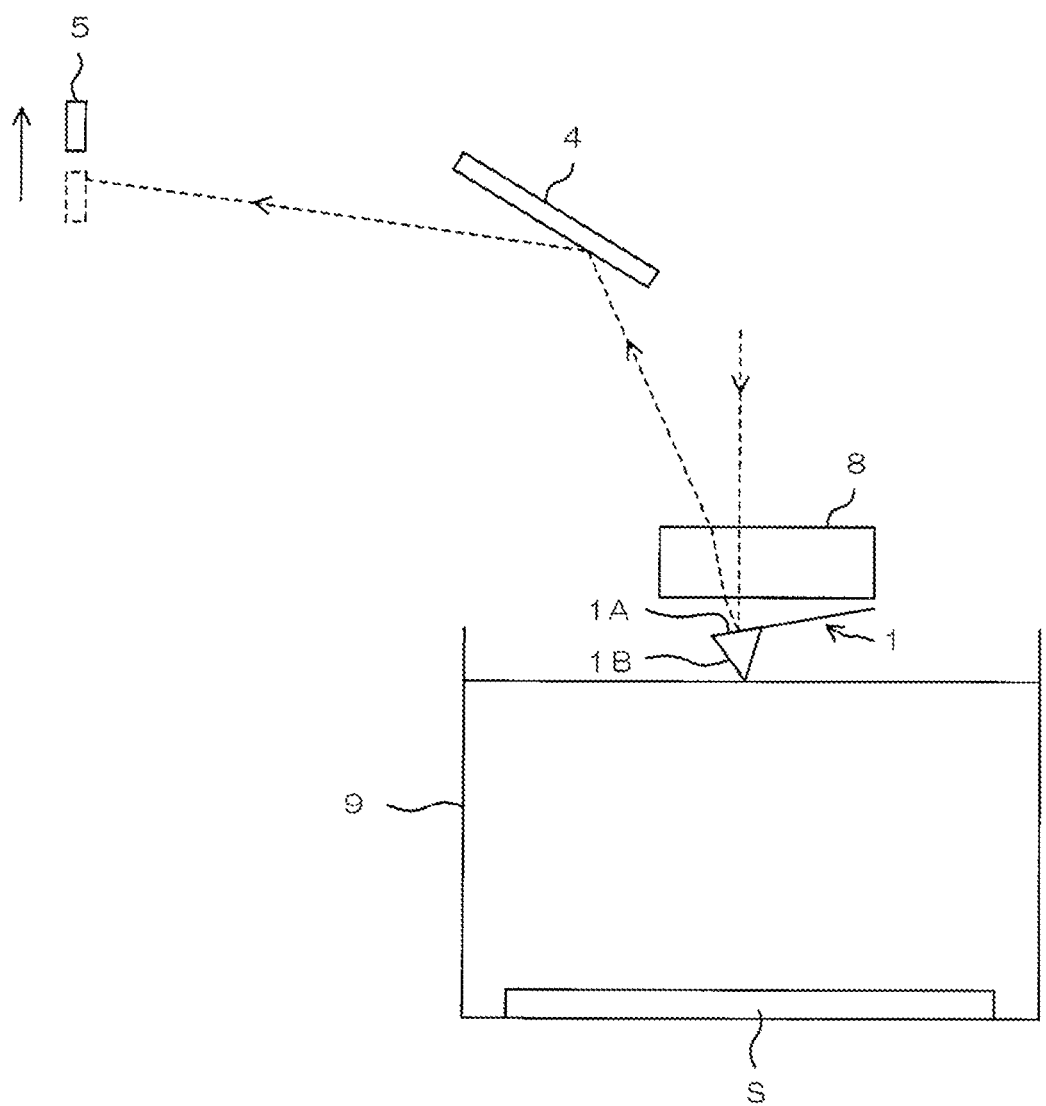
FIG. 2C is a schematic diagram for explaining a specific method for performing in-liquid observation, showing a state after a photodetector is moved.

When the liquid surface is detected during the approaching operation, as shown in FIG. 2C, the photodetector 5 is moved to a position where reflected light from the reflective surface 1A is not incident. The position of the photodetector 5 after the movement is the position where the reflected light from the reflective surface 1A is incident with the cantilever 1 being in the liquid. Since the optical path of the reflected light from the reflective surface 1A varies according to a refractive index of the liquid in the container 9, the position of the photodetector 5 on which the reflected light from the reflective surface 1A is incident in a state where the cantilever 1 is in the liquid can be calculated based on the refractive index of the liquid.

When the approaching operation is continued after the photodetector 5 is moved to the position calculated as described above, the cantilever 1 enters the liquid, and the reflected light from the reflective surface 1A is incident on the photodetector 5. When the reflected light from the reflective surface 1A is detected in the photodetector 5 after movement as described above, the cantilever 1 can be determined to be in the liquid. At this time, the position of the photodetector 5 is finely adjusted, so that the optical axis L of the reflected light incident on the photodetector 5 is adjusted.

In the optical axis adjustment, the position of the photodetector 5 is finely adjusted so that the reflected light from the reflective surface 1A is incident on a reference position in the photodetector 5. The reference position is, for example, a center position of a light receiving surface of the photodetector 5, and is a position at which the detection signal from the photodetector 5 has a reference value (for example, 0 V). By setting a predetermined threshold value as a target value with respect to this reference value, when the detection signal from the photodetector 5 reaches the target value, the probe 1B of the cantilever 1 can be determined to come into contact with the surface of the sample S.

Figure 2D:
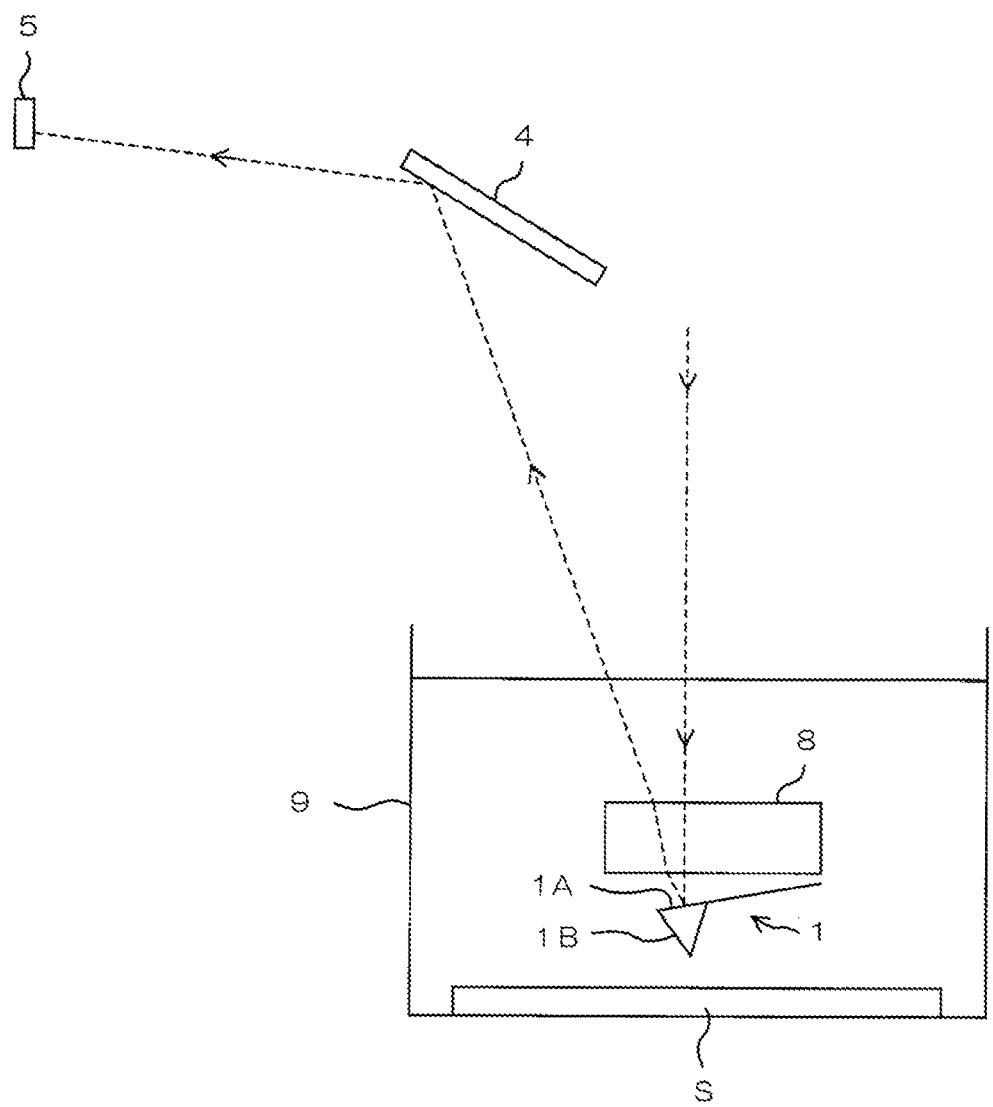
FIG. 2D is a schematic diagram for explaining a specific method for performing in-liquid observation, showing a state where the cantilever is in liquid.

That is, after the optical axis adjustment is performed with the cantilever 1 being in the liquid, the approaching operation is continued, and the cantilever 1 is brought even closer to the sample S as shown in FIG. 2D. When the probe 1B of the cantilever 1 comes into contact with the surface of the sample S, the cantilever 1 is deflected so that the optical path of the reflected light from the reflective surface 1A changes, and the light receiving position for the reflected light in the photodetector 5 changes. Along with this, since the detection signal from the photodetector 5 changes, that the probe 1B of the cantilever 1 has come into contact with the surface of the sample S can be detected (sample surface detection) based on the change in the detection signal.

When the surface of the sample S is detected, the movement of the cantilever 1 is stopped, and the approaching operation is terminated. After the above, the surface of the sample S is observed by causing the cantilever 1 to perform scanning in the horizontal direction.

3. Electrical Configuration

Figure 3:
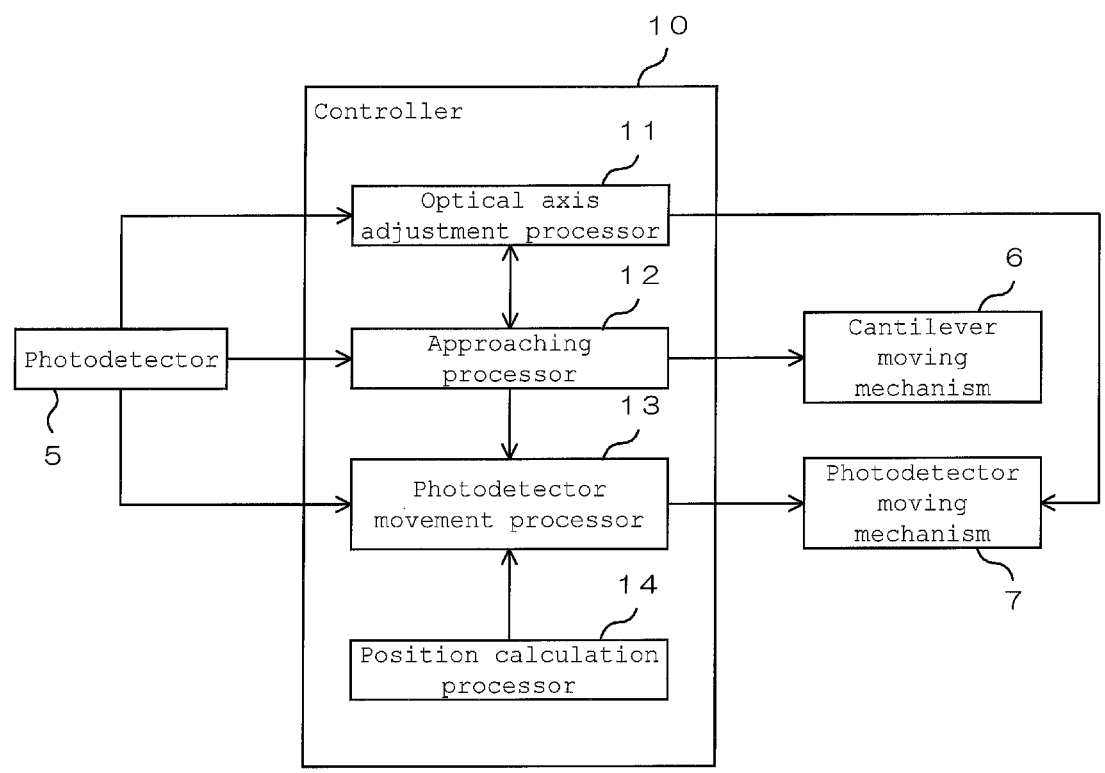
FIG. 3 is a block diagram showing an example of an electrical configuration of the scanning probe microscope.

FIG. 3 is a block diagram showing an example of an electrical configuration of the scanning probe microscope. The scanning probe microscope includes a controller 10 and the like in addition to the photodetector 5, the cantilever moving mechanism 6 and the photodetector moving mechanism 7 described above. The controller 10 has a configuration including, for example, a central processing unit (CPU), and, with the CPU executing a program, functions as an optical axis adjustment processor 11, an approaching processor 12, a photodetector movement processor 13, and a position calculation processor 14, and the like.

The optical axis adjustment processor 11 adjusts the optical axis L of the reflected light from the cantilever 1 incident on the photodetector 5. That is, the optical axis adjustment processor 11 controls the photodetector moving mechanism 7 based on the detection signal from the photodetector 5, and finely adjusts the position of the photodetector 5, so as to adjust the optical axis L to a position where the detection signal from the photodetector 5 has the reference value.

The approaching processor 12 controls the cantilever moving mechanism 6 to bring the cantilever 1 closer to the sample S, so as to perform the approaching operation. When in-liquid observation is performed, the approaching operation is started from a position where the cantilever 1 is spaced upward from the liquid surface, and the cantilever 1 is gradually brought close to the sample S placed in the liquid. After that, when the surface of the sample S is detected based on the detection signal from the photodetector 5, the approaching operation is finished.

The photodetector movement processor 13 is in a state as shown in FIG. 2B during the approaching operation, and, when the liquid surface is detected based on the detection signal from the photodetector 5, controls the photodetector moving mechanism 7 to move the photodetector 5. At this time, as shown in FIG. 2C, the photodetector 5 moves to a position where the reflected light from the cantilever 1 is not incident. This position is a position where the reflected light from the cantilever 1 is incident with the cantilever 1 being in the liquid.

The position calculation processor 14 calculates a position to which the photodetector 5 is moved by the photodetector movement processor 13, that is, the position of the photodetector on which the reflected light from the cantilever 1 is incident in a state where the cantilever 1 is in the liquid. When the liquid surface is detected during the approaching operation, the photodetector movement processor 13 moves the photodetector 5 to the position calculated by the position calculation processor 14. The calculation performed by the position calculation processor 14 is based on the refractive index of the liquid in the container 9, a positional relationship of the optical members (the cantilever 1, the light irradiator 2, the beam splitter 3, the mirror 4, the photodetector 5, and the like), and the like.

4. Approaching Operation at the Time of in-Liquid Observation

Figure 4:
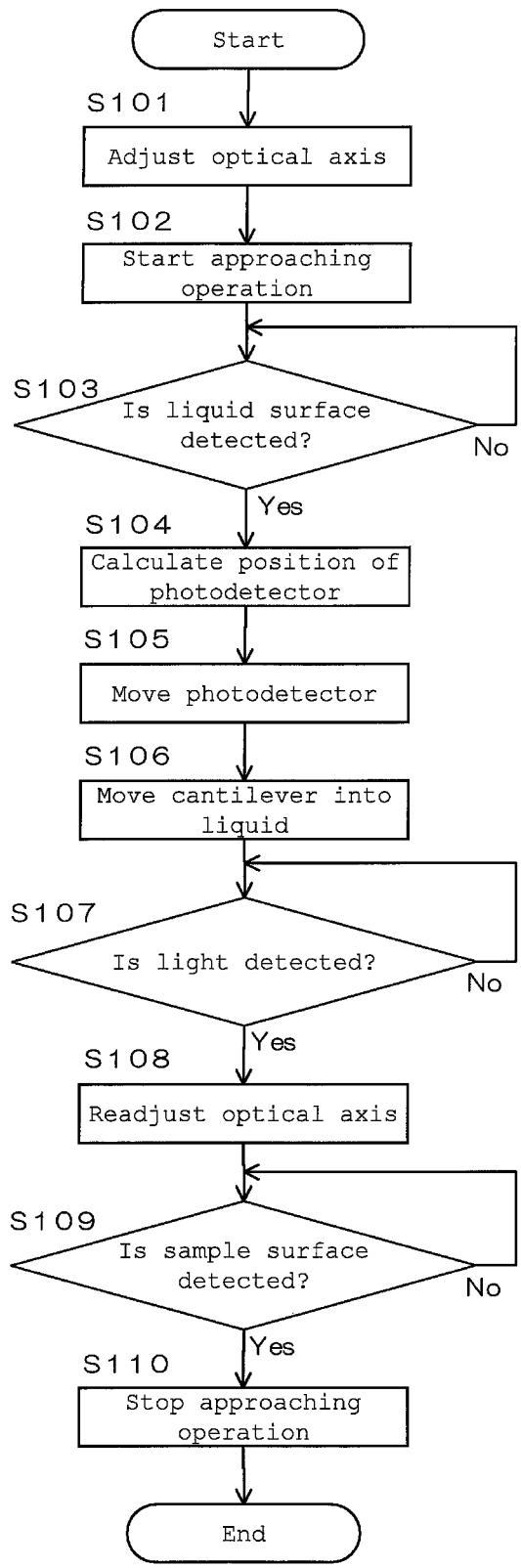
FIG. 4 is a flowchart showing flow of approaching operation at the time of in-liquid observation.

FIG. 4 is a flowchart showing flow of the approaching operation at the time of in-liquid observation. In the approaching operation at the time of in-liquid observation, the optical axis adjustment by the optical axis adjustment processor 11 is first performed in a state in which the cantilever 1 is spaced upward from the liquid surface as shown in FIG. 2A (Step S101). After the above, the approaching processor 12 controls the cantilever moving mechanism 6 so that the approaching operation is started (Step S102). During the approaching operation, the cantilever 1 approaches the sample S placed in the liquid (approaching step).

When the liquid surface is detected based on the detection signal from the photodetector 5 during the approaching operation (Yes in Step S103), the position calculation processor 14 calculates the position to which the photodetector 5 is moved (Step S104: position calculating step). The position of the photodetector 5 calculated at this time is a position where the reflected light from the cantilever 1 is incident in a state where the cantilever 1 is in the liquid as described above.

After the above, the photodetector movement processor 13 controls the photodetector moving mechanism 7, so that the photodetector 5 is moved to the position calculated by the position calculation processor 14 (Step S105: photodetector moving step). During the movement of the photodetector 5, the movement of the cantilever 1 is stopped, so that the approaching operation is stopped. Then, after the photodetector 5 is moved, the approaching operation is continued. In this manner, the cantilever 1 is moved into the liquid (Step S106).

When the cantilever 1 is moved into the liquid, the reflected light from the cantilever 1 is incident on the photodetector 5 moved in advance. In this manner, light is detected in the photodetector 5 (Yes in Step S107). As described above, when the reflected light from the cantilever 1 is incident on the photodetector 5 during the approaching operation continued after the movement of the photodetector 5 by the photodetector movement processor 13, the optical axis adjustment processor 11 controls the photodetector moving mechanism 7, so that the optical axis of the reflected light incident on the photodetector 5 is readjusted (Step S108: optical axis adjusting step). During the optical axis adjustment, the movement of the cantilever 1 is stopped, so that the approaching operation is stopped.

After that, the approaching operation is continued, and when the surface of the sample S is detected based on the detection signal from the photodetector 5 (Yes in Step S109), the movement of the cantilever 1 is stopped, so that the approaching operation is stopped (Step S110). In this manner, the approaching operation at the time of in-liquid observation is completed. After that, the cantilever 1 performs scanning in the horizontal direction, so that the surface of the sample S is observed.

5. Effect (1) In the present embodiment, in a case where the in-liquid observation is performed, when a liquid surface is detected during the approaching operation as shown in FIG. 2B (Yes in Step S103 of FIG. 4), the photodetector 5 is moved as shown in FIG. 2C and the approaching operation is continued (Steps S105 and S106). Since the photodetector 5 is moved to a position where the reflected light from the cantilever 1 is incident in a state where the cantilever 1 is in the liquid, when the photodetector 5 detects light during the continued approaching operation as shown in FIG. 2D (Yes in Step S107), it can be confirmed that the cantilever 1 is in the liquid. At this time, the approaching operation is continued after the optical axis L of the reflected light incident on the photodetector 5 is adjusted (Step S108), so that a surface of the sample S can be detected based on the detection signal from the photodetector 5 during the approaching operation and the approaching operation can be stopped (Steps S109 and S110).

Therefore, when a liquid surface is detected during the approaching operation, it is unnecessary for an operator to manually adjust a target value of the detection signal of the photodetector 5, and the approaching operation can be continued after the photodetector 5 is moved. Therefore, it is possible to reduce the labor required at the time of the approaching operation in the case of performing the in-liquid observation. Then, when light is detected by the photodetector 5 during the continued approaching operation, the approaching operation is continued after the optical axis L of the reflected light incident on the photodetector 5 is adjusted. Accordingly, after the above, when the detection signal from the photodetector 5 reaches the target value, a surface of the sample S can be reliably detected.

(2) In the present embodiment, the optical axis L of the reflected light incident on the photodetector 5 can be adjusted accurately in a state in which the movement of the cantilever 1 is stopped after the cantilever 1 is moved into the liquid. Therefore, the surface of the sample S can be accurately detected based on the detection signal from the photodetector 5 during the approaching operation that is continued after the above.

(3) Furthermore, in the present embodiment, the position calculation processor 14 calculates an appropriate position as the position to which the photodetector 5 is moved when the liquid surface is detected (Step S104), and the photodetector 5 can be moved the position (Step S105). Therefore, it is possible to reliably confirm that the cantilever is in the liquid based on the detection signal from the photodetector 5 during the approaching operation that is continued after the above.

6. Variation

In the above embodiment, the configuration in which the position to which the photodetector 5 is moved is calculated by the position calculation processor 14 during the approaching operation is described. However, the present invention is not limited to such a configuration. For example, the position to which the photodetector 5 is moved may be calculated in advance and stored in a storage unit (not shown), or may be stored in a storage unit in advance as a value predetermined for each type of liquid.

Further, the approaching operation at the time of the in-liquid observation described with reference to FIG. 4 is not limited to a configuration in which all the steps are automatically performed under the control of the controller 10, and at least part of the steps may be manually performed by an operator.

What is claimed is:

1. A scanning probe microscope, comprising:
   a cantilever configured to move along a surface of a solid sample;
   a light irradiator configured to irradiate the cantilever with light;
   a photodetector configured to be moveable and to receive reflected light from the cantilever;
   an approaching processor configured to perform an approaching operation by bringing the cantilever close to a solid sample placed in liquid;
   a photodetector movement processor configured to move the photodetector to a position where reflected light from the cantilever is calculated to be incident when the cantilever is in the liquid, as the cantilever approaches the liquid, wherein the photodetector movement processor moves the photodetector when a liquid surface is detected based on a detection signal from the photodetector during the approaching operation; and
   an optical axis adjustment processor configured to adjust an optical axis of reflected light incident on the photodetector when the reflected light from the cantilever is incident on the photodetector during the approaching operation continued after the movement of the photodetector by the photodetector movement processor,
   wherein the approaching processor is further configured to stop the approaching operation when a surface of a solid sample is detected based on a detection signal from the photodetector during the approaching operation continued after the adjustment of an optical axis by the optical axis adjustment processor.

2. The scanning probe microscope according to claim 1, wherein the approaching processor is further configured to stop movement of the cantilever during the adjustment of an optical axis by the optical axis adjustment processor.

3. The scanning probe microscope according to claim 1, further comprising:
   a position calculation processor configured to calculate the position of the photodetector on which the reflected light from the cantilever is incident when the cantilever is in the liquid,
   wherein the photodetector movement processor is further configured to move the photodetector to the position calculated by the position calculation processor.

4. A cantilever moving method for a scanning probe microscope including a cantilever that is moved along a surface of a solid sample, a light irradiator that irradiates the cantilever with light, and a photodetector that receives reflected light from the cantilever, the cantilever moving method comprising:
   an approaching step for performing an approaching operation by bringing the cantilever close to a solid sample placed in liquid;
   a photodetector moving step for moving the photodetector, as the cantilever approaches the liquid, to a position where reflected light from the cantilever is calculated to be incident when the cantilever is in the liquid when a liquid surface is detected based on a detection signal from the photodetector during the approaching operation; and
   an optical axis adjusting step for adjusting an optical axis of reflected light incident on the photodetector when the reflected light from the cantilever is incident on the photodetector during the approaching operation continued after the moving of the photodetector by the photodetector moving step,
   wherein when a surface of a solid sample is detected based on a detection signal from the photodetector during the approaching operation continued after the adjustment of an optical axis by the optical axis adjusting step, the approaching step stops the approaching operation.

5. The cantilever moving method according to claim 4, wherein the approaching step further comprises:
   stopping movement of the cantilever during the adjustment of an optical axis by the optical axis adjusting step.

6. The cantilever moving method according to claim 4, further comprising:
   a position calculating step for calculating the position of the photodetector on which the reflected light from the cantilever will be incident when the cantilever is in the liquid,
   wherein in the photodetector moving step, the photodetector is moved to the position calculated by the position calculating step.

* * * * *